Dec. 25, 1962   R. A. OSWALD   3,069,986
APPARATUS FOR PHOTOGRAPHING RACES
Filed July 6, 1959   2 Sheets-Sheet 1

INVENTOR.
Robert A. Oswald
BY

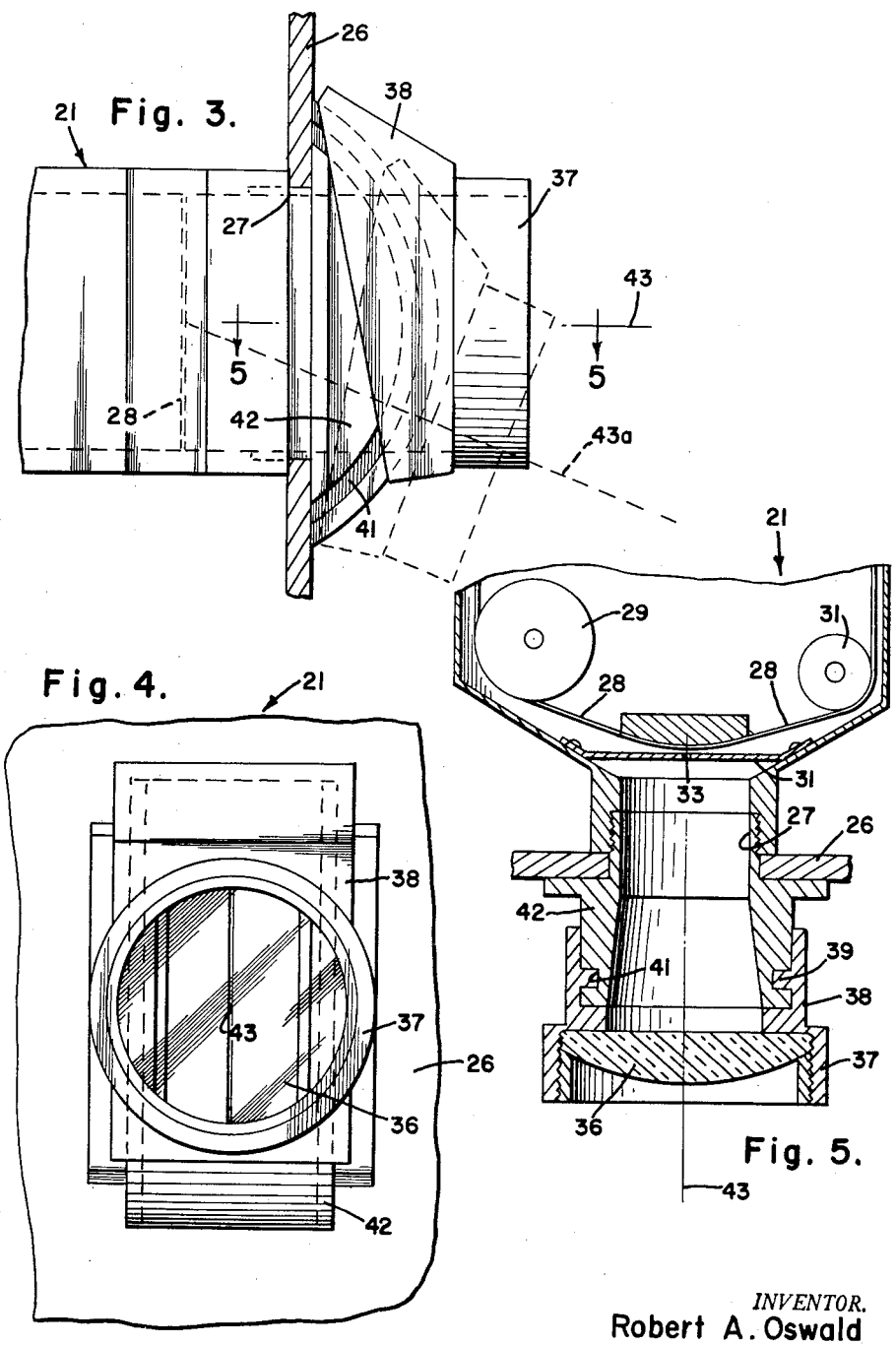

United States Patent Office 3,069,986
Patented Dec. 25, 1962

3,069,986
APPARATUS FOR PHOTOGRAPHING RACES
Robert Andrew Oswald, 5701 W. Adams Blvd.,
Los Angeles 16, Calif.
Filed July 6, 1959, Ser. No. 825,264
1 Claim. (Cl. 95—11)

This invention relates to a new and improved apparatus for photographing races. More particularly, this invention relates to an improvement in cameras of the type shown in Belock Patent No. 2,257,100. In such cameras the film is caused to move continuously behind a narrow slit aligned with the finish line of a rack track at a speed substantially equal to the speed of the image of the horses. This type of camera is herein denominated "Photo Finish Camera," and this method of photography is herein designated "Photo Finish Photography." Photo finish cameras and photo finish photography are well understood in the art, and detailed illustration and explanation of such cameras and methods is believed unnecessary.

One of the problems encountered in the use of photo finish cameras is the fact that the depth of focus on long lenses is insufficient to cover the width of the track and hence the focus of horses near the infield rail as contrasted with horses away from the rail is different, and therefore the sharpness of the image of each horse tends to vary, depending upon its location relative to the width of the track. Another undesirable feature of the use of such cameras is distortion of the length of the horses on the developed picture, depending upon the location of the horses relative to the width of the track. Thus in the latter connection, horses located far from the infield rail tend to be shortened, whereas horses close to the rail tend to be elongated.

The present invention comprises an improvement in photo finish cameras and methods, wherein the sharpness of focus across the width of the track is improved, and the distortion in the length of the horses as developed on the film is largely eliminated.

The present invention involves hinging a lens to the camera case so that its optical axis relative to the plane of the moving film is adjustable, depending upon the location of the camera relative to the track. Thus, the present invention provides a camera adjustable to the vertical axis of the camera so that as the camera is moved from track to track it can properly be focused.

A further feature of the invention is the provision of an arcuate slide mounting for the lens holder so that the angular position of the lens holder may be adjusted. The present invention allows for a parallel exposure band across the track, even though the edges of the slit through which the object is photographed are parallel. Additionally, focus throughout the entire width of the track is uniform. Further, the image size of the horses is substantially identical whether the horse is running wide or close to the infield rail.

A still further feature of the invention is the provision of means to facilitate tipping the lens axis relative to the plane of the moving film.

A further advantage of the invention is that it provides a means of keeping the optical axis of the lens on the center line of the film in a horizontal plane, thereby insuring focus over the width of the film. Thus the focus does not fall off over the width of the film.

Other objects of the present invention will become apparent upon reading the following specification and referring to the accompanying drawings in which similar characters of reference represent corresponding parts in each of the several views.

In the drawings:

FIG. 3 is a fragmentary, vertical sectional view through a photo finish camera.

FIG. 4 is a fragmentary front elevational view.

FIG. 5 is a fragmentary, horizontal sectional view taken substantially along the line 5—5 of FIG. 3.

Figure 1:
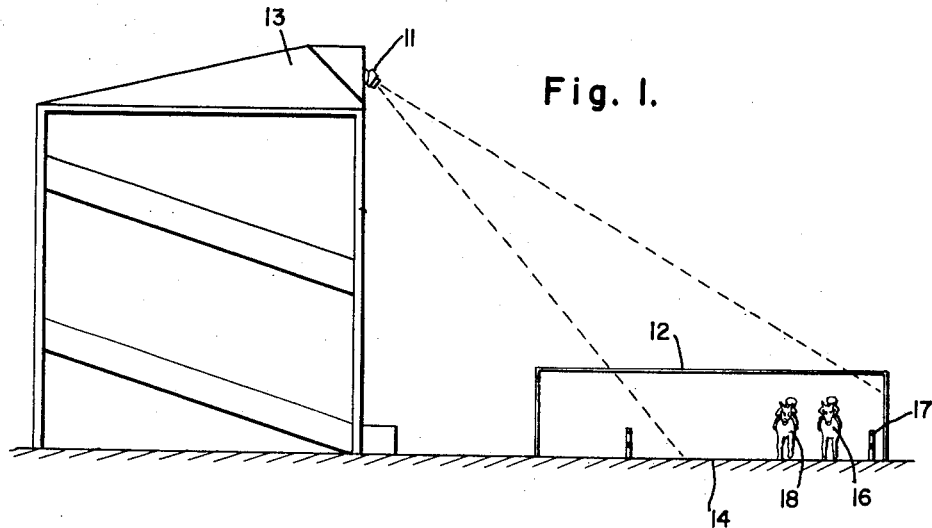
FIG. 1 is a schematic end elevational view showing the location of photo finish camera relative to a race horse.

In the accompanying drawings, as illustrated in FIG. 1, a photo finish camera 11 is mounted in alignment with the finish line 12 of a race course and, for practical purposes, it is generally located in some such position as on the roof 13 of the grandstand so that the camera is elevated above the track 14, thereby enabling the view of the camera to include the full width of the track. It will be further understood that during the filming of the race one or more of the horses 16 may be located close to the infield rail 17, whereas other horses 18 may be running wide and located at a distance from the infield rail.

Figure 2:
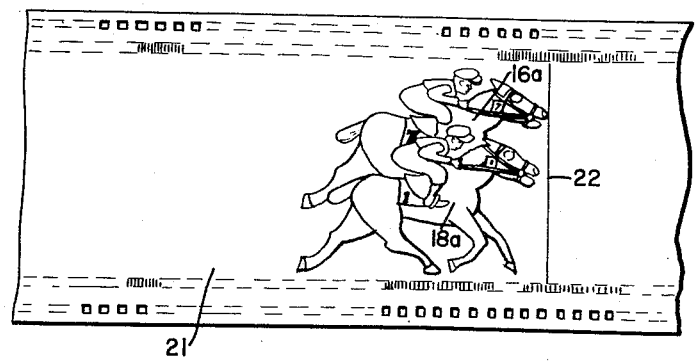
FIG. 2 is a schematic view of a portion of a picture produced by a photo finish camera, illustrating the sharpness of focus and the uniformity in length of the image of the horse.

A typical picture 21 obtained by the use of a photo finish camera is shown in FIG. 2. By means forming no part of the present invention, the image of each horse 16, 18 as it crosses the finish line 12 appears in the film. A fictitious finish line 22 is drawn or developed on the film 21 at right angles to the path of the image of the horses, and by comparison of the image of the nose of the horse with said finish line, the winner of the race may be judged. Although in patent art and literature relating to photo finish cameras and methods the images 16a, 18a of the horses may be shown as of substantially equal length and the focus of the various horses regardless of their position relative to the infield rail may be shown uniform, nevertheless, for practical purposes, it has been found that the focus varies depending upon the location of the horse relative to the width of the track as does the length of the image of the horse on the film.

As shown in partially schematic and fragmentary detail in FIGS. 3 to 5, the present invention employs a camera 11 having a front plate 26 formed with an aperture 27 behind which is located moving film 28. The film 28 is caused to move from a storage reel 29 to a takeup reel 31 by means of a motor (not shown) or clockwork mechanism, the speed of movement of the film 28 being adjusted to the speed of movement of the image of the horses on the plane of the film. Located forwardly of the front plate 26 is a lens 36 which functions to focus the images of the horses through the slit 33 and upon the film plane. In accordance with the present invention, the lens is secured in a lens holder 37 or lens tube which is fixed to a substantially trapezoidal extension 38 immediately rearwardly of the lens tube. The extension 38 has inwardly projecting lugs 39 which interfit with arcuate trackways 41 in a support 42 fixed to the face plate 26 in proximity to the aperture 27. As best shown in FIG. 3, trackways 41 are arcuate and have an axis of curvature located at the film plane 28 and substantially midway of the length of slit 33. By moving extension 38 upwardly or downwardly along trackways 41, the angular position of the optical axis 43 of the lens relative to the film plane 28 may be adjusted. Thus, when the lens is in the position shown in solid lines in FIG. 3, its optical axis indicated by reference numeral 43 is perpendicular to the plane of the film 28. In another position of adjustment of lens 36 shown in dotted lines of FIG. 3, the optical axis 43a is moved to an acute angle relative to the plane of the film. Any intermediate position of adjustment may be selected depending upon track conditions. Further, as the camera is moved from track to track the position of the lens 36 may be adjusted to suit any condition by sliding the lugs 39 along the trackway 41 to accomplish the desired result.

In use, the operator of the camera upon commencing to photograph races adjusts the lens 36 until the angle of the optical axis 43 of the lens relative to the film plane 28 is such that by visual observation the focus is uniform across the width of the track 14. When this adjustment is obtained not only is the focus uniform but the image 16a, 18a of each horse 16, 18 as exposed on the film plane is substantially identical across the width of the track. Once the camera has properly been sighted the adjustment may remain constant throughout the racing meet. As each race is run, the camera 21 is operated in customary fashion, namely, the film 28 is caused to move behind the slit 33 at a proper speed to expose the images of the horses on the film as they cross the finish line 12. Thereupon, the film is developed and printed in customary fashion and the fictitious finish line 22 imposed so that the winner may be judged The focus of images 16a, 18a is uniform and the length is likewise uniform, thereby improving over pictures commonly produced by photo finish photography.

Although the foregoing invention has been described in some detail by way of illustration and example for purposes of clarity of understanding, it is understood that certain changes and modifications may be practiced within the spirit of the invention and scope of the appended claim.

What is claimed is:

In a photo finish camera of the type having a casing having an apertured face plate, means for continuously moving a film behind said face plate, a mask having a substantially vertical, narrow slit interposed between said face plate and film, a lens, and a lens holder for said lens, the improvement comprising, a support on said face plate surrounding the aperture in said face plate formed with arcuate grooves, the centers of curvature of said grooves lying on a horizontal axis lying approximately in the plane of the moving film, and extension on said lens holder partially fitting around said support and having lugs fitting into said grooves for hingedly mounting said lens holder on said casing for pivotal movement about a horizontal axis lying approximately in the plane of the film moving behind said mask.

References Cited in the file of this patent
UNITED STATES PATENTS

| | | |
|---|---|---|
| 2,051,192 | Wittel | Aug. 18, 1936 |
| 2,376,993 | Evans | May 29, 1945 |
| 2,413,272 | Wheelwright | Dec. 24, 1946 |
| 2,430,975 | Crowley | Nov. 18, 1947 |